United States Patent [19]

Ouchi

[11] Patent Number: 5,052,982
[45] Date of Patent: Oct. 1, 1991

[54] MOTION ATTENUATED HYDRAULIC AUTOTENSIONER

[75] Inventor: Hideo Ouchi, Kanagawa, Japan

[73] Assignee: Nippon Seiko Kabushiki Kaisha, Tokyo, Japan

[21] Appl. No.: 537,849

[22] Filed: Jun. 13, 1990

[30] Foreign Application Priority Data

Jun. 20, 1989 [JP] Japan .................. 1-155662

[51] Int. Cl.⁵ .............................................. F16H 7/12
[52] U.S. Cl. .................................... 474/135; 474/138
[58] Field of Search ............... 474/101, 136, 138, 111, 474/70, 109, 113, 114, 115, 117, 135; 180/231

[56] References Cited

U.S. PATENT DOCUMENTS

| | | | |
|---|---|---|---|
| 1,852,755 | 4/1932 | Peo | 188/276 |
| 4,413,982 | 11/1983 | Foster | 474/138 |
| 4,563,167 | 1/1986 | Foster | 474/115 |
| 4,601,683 | 7/1986 | Foster | 474/135 |
| 4,615,096 | 10/1986 | Foster | 474/138 |
| 4,624,652 | 11/1986 | Foster | 474/135 |
| 4,634,408 | 1/1987 | Foster | 474/135 |
| 4,708,697 | 11/1987 | Foster | 474/135 |
| 4,721,495 | 1/1988 | Kan et al. | 474/135 |

FOREIGN PATENT DOCUMENTS 79975 10/1973 Japan .

*Primary Examiner*—Ramon S. Britts
*Assistant Examiner*—Roger J. Schoeppel
*Attorney, Agent, or Firm*—Caesar, Rivise, Bernstein, Cohen & Pokotilow, Ltd.

[57] ABSTRACT

An autotensioner which is designed to apply appropriate tension to a timing belt of an engine or a belt that drives auxiliary machinery, for example, an alternator, compressor, etc. The autotensioner has an annular space that is partitioned into two chambers by a first partition wall which is provided on a fixed member and a second partition wall which is provided on a pivoting member, the annular space being filled with a viscous fluid. The first partition wall is formed with a passage which provides communication between the two chambers, and a check valve is provided in the passage. The check valve closes the passage when the tension in the belt increases suddenly, to resist the pivotal movement of the tensioner in one rotational direction, thereby enabling the tensioner to follow slowly and effectively the movement of the belt in which the tension is suddenly increased. The check valve opens the passage when the portion of the belt engaged by the tensioner becomes slack, thereby decreasing the resistance to movement of the second partition wall within the viscous fluid, thus enabling the tensioner to move rapidly in a rotational direction opposite the direction of movement of the tensioner when the tension in the belt increases.

3 Claims, 4 Drawing Sheets

MOTION ATTENUATED HYDRAULIC AUTOTENSIONER

BACKGROUND OF THE INVENTION

1. Field of the Invention

The present invention relates to an autotensioner which is used to apply appropriate tension to the timing belt of an automotive engine or to a belt for driving auxiliary machinery, for example, an alternator, compressor, etc.

2. Description of the Prior Art

To drive a cam shaft of an OHC or DOHC type engine to rotate synchronously with the crankshaft, a drive mechanism that employs a timing belt 1, such as that shown in FIG. 14, is widely used.

In FIG. 14, reference numeral 2 denotes a driving pulley that is driven to rotate by the crankshaft of an engine, 3 a driven pulley that is secured to an end portion of a cam shaft, and 4 a tension pulley for applying appropriate tension to the timing belt 1.

The tension pulley 4 is, as shown in the enlarged view of FIG. 15, rotatably supported by a portion of a pivoting member 6 that pivots about a fixed shaft 5, the portion being eccentric with respect to the fixed shaft 5. A tension spring 8 is connected at one end thereof to the distal end portion of an arm piece 7 that is secured at its proximal end to the pivoting member 6, thereby applying resilient force to the pivoting member 6 in a direction in which the tension pulley 4 is resiliently pressed against the timing belt 1, and thus maintaining the tension in the timing belt 1 at a constant level irrespective of a change in the size of the timing belt 1 caused by a temperature change, for example, or oscillations of the belt 1 caused by the operation of the engine. This mechanism is generally known as autotensioner.

The conventional autotensioner, however, involves the following problems.

When the driving pulley 2 in the arrangement shown in FIGS. 14 and 15 rotates counterclockwise, as shown by an arrow a in FIG. 14, the left half of the timing belt 1 tends to become taut, while the right half tends to become slack.

The autotensioner, which includes the tension pulley 4, is provided at the right half of the timing belt 1, that is, the portion of the belt 1 which tends to become slack. However, when the engine comes to a stop, it is likely to momentarily rotate in the reverse direction. During this moment, the right half of the timing belt 1 tends to become taut.

If the tension pulley 4 directly follows the movement of the timing belt 1 when such a sudden change in tension occurs, a large amount of slack momentarily occurs in the timing belt 1. In an extreme case, the slack in the timing belt 1 causes an undesired shift in the mesh between the belt 1 and the toothed pulleys (driving and driven pulleys 2 and 3), resulting in a difference in the phase of rotation between the engine crankshaft and the cam shaft.

To solve this problem, damper resistance that occurs between the fixed shaft 5 and the pivoting member 6 may be utilized in such a manner that the tension pulley 4 will not immediately follow a sudden change in the tension. In such a case, however, when the tension pulley 4 is rotating in a normal state (i.e., tension variations are small), it may be unable to follow fine oscillations of the timing belt 1. Thus, this arrangement may cause oscillations of the timing belt 1.

Under these circumstances, Japanese Patent Public Disclosure (KOKAI) No. 63-167163 discloses an invention wherein an oil damper mechanism and a roller-type one-way clutch are provided around the fixed shaft 5 so that the tension pulley 4 immediately follows the movement of the belt 1 only when the belt 1 becomes slack.

The disclosed invention suffers, however, from a lack of durability due to the following reasons: it is difficult to lubricate the roller type one-way clutch; fretting corrosion is likely to occur due to the type of structure; and the tension in the belt is supported by a roller.

SUMMARY OF THE INVENTION

It is an object of the present invention to provide an autotensioner which is free from the above-described problems of the prior art.

The autotensioner of the present invention has a fixed shaft, a pivoting member which is rotatably supported around the fixed shaft, at least the proximal portion of the member having a cylindrical configuration, a pulley which is rotatably supported around a pivot shaft that is a part of the pivoting member, the pivot shaft being parallel to the fixed shaft, and a spring which presses the pulley against a member to which tension is to be applied, in the same way as in the conventional autotensioner stated above.

The autotensioner of the present invention further has an annular space which is provided between the outer peripheral surface of the fixed shaft and the inner peripheral surface of the pivoting member, the space being filled with a viscous fluid, a first partition wall which is formed on a part of the outer peripheral surface of the fixed shaft, the partition wall having its outer peripheral edge in close proximity to the inner peripheral surface of the pivoting member to partition the annular space circumferentially, and a second partition wall which is formed on a part of the inner peripheral surface of the pivoting member, the second partition wall having its inner peripheral edge in close proximity to the outer peripheral surface of the fixed shaft to partition the annular space circumferentially, thus the second partition wall being moved within the viscous fluid that fills the annular space.

According to a first aspect of the present invention, which corresponds to the appended claim 1, the above-described autotensioner has a passage which is provided circumferentially in at least either one of the first and second partition walls, and a check valve which is provided in the intermediate part of the passage, the check valve being arranged to open the passage only when the pulley is moved by the resilient force of the spring.

According to a second aspect of the present invention, which corresponds to the appended claim 3, the above-described autotensioner has a passage which is defined by a space that is formed by separating at least either one of the outer peripheral edge of the first partition wall and the inner peripheral edge of the second partition wall from a peripheral surface that faces the peripheral edge concerned, and a check valve which is provided in the intermediate part of this passage, the check valve being arranged to open the passage only when the pulley is moved by the resilient force of the spring.

The autotensioner of the present invention, arranged as described above, functions as follows.

When the tension in a belt, to which appropriate tension is to be applied by the autotensioner, is suddenly increased at a part thereof which is pressed by the pulley that is supported on the pivoting member through the pivot shaft, the pivoting member is caused to pivot suddenly against the resilient force of the spring and consequently the second partition wall that is formed on the inner peripheral surface of the pivoting member is caused to move within the viscous fluid that fills the annular space.

However, when the pulley is caused to move against the resilient force of the spring in this way, the check valve, which is provided in the intermediate part of the passage that is provided in at least either one of the first and second partition walls (in the case of the appended claim 1) or the passage that is formed in between either one of the outer peripheral edge of the first partition wall and the inner peripheral edge of the second partition wall and a peripheral surface that faces the peripheral edge concerned (in the case of the appended claim 3), is left closed. Accordingly, strong resistance acts on the second partition wall when moving within the viscous fluid that fills the annular space, so that the pivoting member is only allowed to move slowly and effectively, thus enabling the pulley to follow slowly and effectively the movement of the belt in which the tension is increased suddenly. Thus, the other part of the belt is prevented from becoming excessively slack.

Conversely, when a part of the belt which is pressed by the pulley suddenly becomes slack, the check valve that is provided in the passage opens, so that resistance to the second partition wall that moves within the viscous fluid decreases. Accordingly, the pivoting member is allowed to pivot rapidly by the resilient force of the spring, thus enabling the pulley to follow the slack in the belt.

In short, the autotensioner of the present invention acts in such a manner that, when a part of the belt that is in contact with the pulley becomes tense, the pulley slowly and effectively follows the movement of the belt, whereas, when that part of the belt becomes slack, the pulley rapidly follows the movement of the belt, thus preventing, in either case, occurrence of excessive slack in any part of the belt.

BRIEF DESCRIPTION OF THE DRAWINGS

FIGS. 1 to 5 show in combination a first embodiment of the present invention, in which:

FIG. 1 is a sectional view showing the whole structure of the embodiment;

FIG. 2 is a sectional view taken along the line A—A in FIG. 1;

FIG. 3 shows only a pivoting member as viewed from the right-hand side of FIG. 1; and FIGS. 4 and 5 are enlarged views of the part B of FIG. 2, FIG. 4 showing the behavior of a check valve when a belt becomes slack, and FIG. 5 showing the behavior of the check valve when the belt becomes taut.

FIGS. 6 to 9 show in combination a second embodiment of the present invention, in which:

FIG. 6 is a sectional view showing the whole structure of the embodiment;

FIG. 7 is a sectional view taken along the line C—C in FIG. 6; and

FIGS. 8 and 9 are enlarged views of the part D of FIG. 7, FIG. 8 showing the behavior of the check valve when the belt becomes slack, and FIG. 9 showing the behavior of the check valve when the belt becomes taut.

FIGS. 10 to 13 show in combination a third embodiment of the present invention, in which:

FIG. 10 is a view corresponding to a sectional view taken along the line C—C in FIG. 6;

FIG. 11 is an exploded perspective view of a check valve that is employed in the third embodiment; and FIGS. 12 and 18 are enlarged views of the part E of FIG. 10, FIG. 12 showing the behavior of the check valve when the belt becomes slack, and FIG. 13 showing the behavior of the check valve when the belt becomes taut.

DETAILED DESCRIPTION OF THE PREFERRED EMBODIMENTS

The present invention will be described below in more detail by way of embodiments and with reference to the accompanying drawings.

Figure 1:
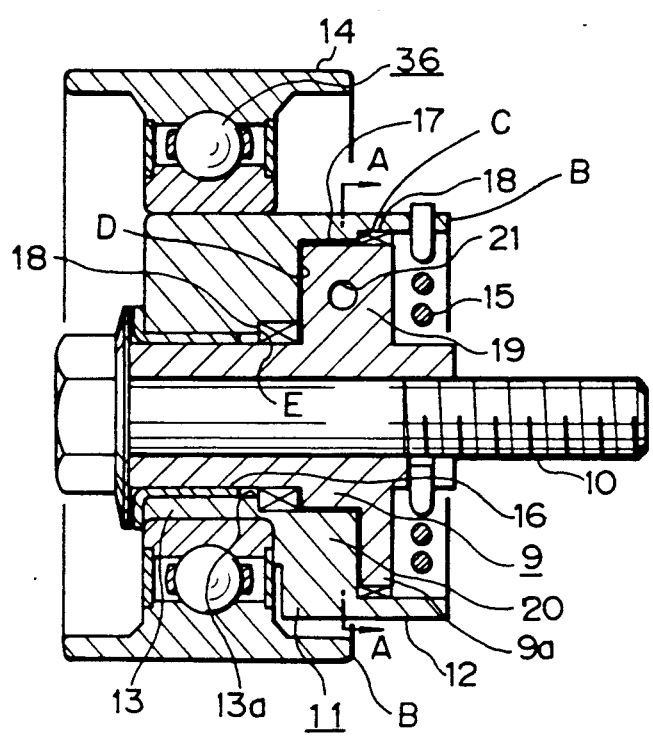
Figure 2:
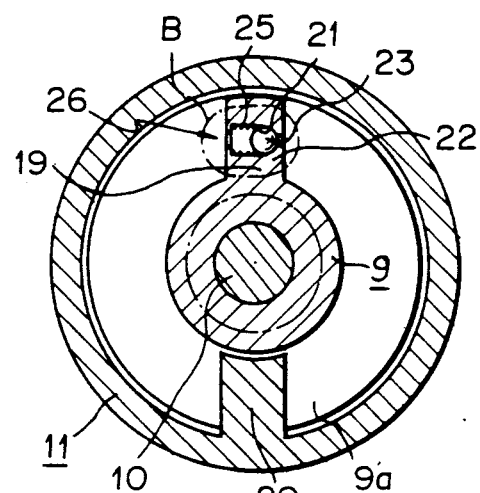
Figure 3:
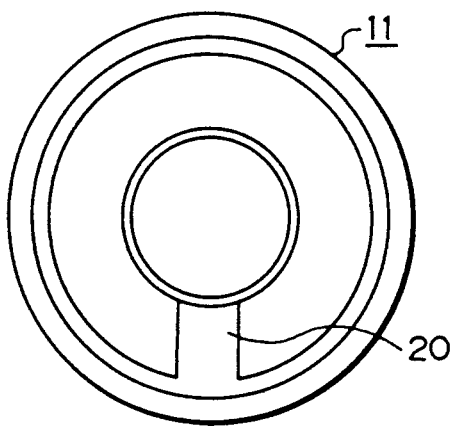
Figure 4:
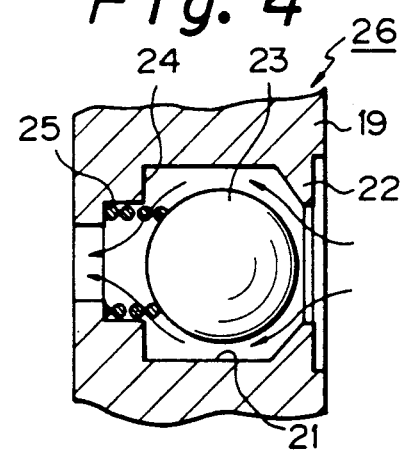
Figure 5:
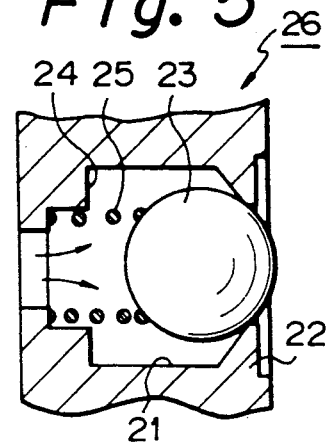

FIGS. 1 to 5 show in combination a first embodiment of the present invention, in which: FIG. 1 is a sectional view showing the whole structure of the embodiment; FIG. 2 is a sectional view taken along the line A—A in FIG. 1; FIG. 3 shows only a pivoting member as viewed from the right-hand side of FIG. 1; and FIGS. 4 and 5 are enlarged views of the part B of FIG. 2, FIG. 4 showing the behavior of a check valve when a belt becomes slack, and FIG. 5 showing the behavior of the check valve when the belt becomes taut.

Reference numeral 9 denotes a fixed shaft which is in the form of a cylinder that has a flange portion 9a which is formed along the outer peripheral surface of a portion which is closer to the proximal end (the right end as viewed in FIG. 1). When the autotensioner is to be used, the fixed shaft 9 is secured by means of a bolt 10 to the front side of the cylinder block of an engine (in the case where the autotensioner is designed for a timing belt).

Reference numeral 11 denotes a pivoting member which comprises a short cylindrical proximal portion 12 which fits on the flange portion 9a, and a pivot portion 13 which projects from the outer end face (the left end face as viewed in FIG. 1) of the proximal portion 12, the pivot portion 13 being eccentric with respect to the proximal portion 12. A pulley 14 is rotatably supported around the pivot portion 13 through a rolling bearing 36. The pivot portion 13 is fitted on the distal end portion of the fixed shaft 9 through a sliding bearing 16.

Reference numeral 15 denotes a torsion coil spring for application of resilient force to pivot the pivoting member 11. One end of the spring 15 is retained by a proximal end portion of the fixed shaft 9 which projects from the flange portion 9a, while the other end of the spring 15 is retained by the proximal end portion of the pivoting member 11.

In consequence, the pivoting member 11 is caused to pivot about the pivot portion 13 by the resilient force of the torsion coil spring 15, and the pulley 14 that is supported around the pivoting member 11 is movable in response to the pivotal motion of the member 11 by an amount corresponding to the eccentricity of the pivot portion 13 with respect to the fixed shaft 9.

The above-described arrangement is the same as that of autotensioners which have heretofore been known. In the autotensioner of the present invention, which is shown in FIGS. 1 to 5, however, an annular space 17 is provided between the outer peripheral surface of the fixed shaft 9 and the inner peripheral surface of the pivoting member 11, and the space 17 is filled with a viscous fluid, for example, oil.

More specifically, a sealing member 18 is provided between the outer peripheral edge of the flange portion 9a and the inner peripheral surface of the proximal portion 12 of the pivoting member 11, and another sealing member 18 is provided between the inner peripheral surface of the proximal end portion of the pivot portion 13 and the outer peripheral surface of the intermediate portion of the fixed shaft 9, thereby preventing leakage of the viscous fluid that fills the annular space 17, which is present between the two sealing members 18.

A first partition wall 19 is formed on the outer peripheral surface of a part of the fixed shaft 9 that is located between the flange portion 9a and the inner side surface 13a of the pivot portion 13. The outer peripheral edge of the first partition wall 19 is in close proximity to the inner peripheral surface of the pivoting member 11, and two side edges of the first partition wall 19 are in close proximity to the flange portion 9a and the inner side surface 13a, respectively. As a result, the annular space 17 is circumferentially partitioned by the first partition wall 19 (FIG. 2).

A second partition wall 20 is formed on the inner peripheral surface of a part of the pivoting member 11 that is located between the flange portion 9a and the inner side surface 13a of the pivot portion 13. The inner peripheral edge of the second partition wall 20 is in close proximity to the outer peripheral surface of the fixed shaft 9, and two side edges of the second partition wall 20 are in close proximity to the flange portion 9a and the inner side surface 13a, respectively. As a result, the annular space 17 is also circumferentially partitioned by the second partition wall 20 (FIG. 2).

The second partition wall 20, which is formed on the inner peripheral surface of the pivoting member 11, is movable within the viscous fluid that fills the annular space 17.

Of the first and second partition walls 19 and 20 that partition the annular space 17 circumferentially, the first partition wall 19, which is formed on the outer peripheral surface of the fixed shaft 9, is provided with a passage 21, which extends circumferentially (perpendicularly to the plane of FIG. 1; horizontally as viewed in FIG. 2).

A valve seat 22, which has an inward flange-like configuration, is formed along the inner peripheral edge of the opening of the passage 21, and a ball 23 is loosely fitted in the passage 21, the ball 23 having an outer diameter that is greater than the inner diameter of the valve seat 22. The ball 23 is resiliently pressed toward the valve seat 22 by means of a compression spring 25 which is provided between the ball 23 and a step 24 that is formed on the inner peripheral surface of the intermediate part of the passage 21. In consequence, the ball 23 and the valve seat 22 comprise a check valve 26 which allows the viscous fluid to flow only in one direction (from the right to the left as viewed in FIGS. 2, 4 and 5) within the passage 21.

It should be noted that the torsion coil spring 15 has a pretorqued resilient force which causes the pivoting member 11 to pivot clockwise as viewed in FIG. 2, and the check valve 26 therefore opens the passage 21 only when the pivoting member 11, which supports the pulley 14, is moved counter to the resilient force of the torsion coil spring 15 (i.e., clockwise as viewed in FIG. 3).

The autotensioner of the present invention, which is arranged as described above, is used in a state where the pulley 14 is brought into contact with a belt to which appropriate tension is to be applied and this pulley 14 is pressed against the belt by the resilient force of the torsion coil spring 15. When, in such a used state, the tension in a part of the timing belt that is pressed by the pulley 14 increases suddenly due to the engine stopping, for example, the pivoting member 11 that supports the pulley 14 at the distal end thereof is caused to pivot suddenly clockwise as viewed in FIG. 2 (i.e., counterclockwise as viewed in FIG. 3) against the resilient force of the torsion coil spring 15.

If, in such a case, the movement of the pulley 14 is allowed as it is, the other part of the belt would become excessively slack, causing problems such as an undesired shift in the mesh between the belt and the toothed pulleys (driving and driven pulleys), as described above.

To solve such problems, the autotensioner of the present invention is designed to function as follows.

When the pivoting member 11 is caused to pivot clockwise as viewed in FIG. 2 by a sudden increase in the tension applied to the belt, the second partition wall 20 that is formed on the inner peripheral surface of the pivoting member 11 is forced to move clockwise as viewed in FIG. 2 within the viscous fluid that fills the annular space 17, causing an increase in the pressure of the viscous fluid at the front side of the second partition wall 20 as viewed in the direction of movement thereof. As a result, the viscous fluid in the annular space 17 is caused to flow clockwise as viewed in FIG. 2.

However, when the pivoting member 11, which supports the pulley 14, moves against the resilient force of the torsion coil spring 15 in this way, the direction of the pressure that is applied to the ball 23 coincides with the direction in which the ball 23 is pressed by the compression spring 25, which is incorporated in the check valve 26 that is provided in the intermediate part of the passage 21 in the first partition wall 19. Accordingly, the check valve 26 is left closed, as shown in FIG. 5, so that strong resistance acts on the second partition wall 20 when moving within the viscous fluid in the annular space 17. Thus, the pivoting member 11 is only allowed to move slowly and effectively.

Accordingly, the pulley 14 is enabled to follow slowly and effectively the movement of the belt in which the tension is suddenly increased, thus preventing the other part of the belt from becoming excessively slack.

Conversely, when a part of the timing belt that is pressed by the pulley 14 suddenly becomes slack, the pivoting member 11 that supports the pulley 14 is caused to pivot counterclockwise as viewed in FIG. 2 (i.e., clockwise as viewed in FIG. 3). In consequence, the second partition wall 20 that is formed on the inner peripheral surface of the pivoting member 11 is forced to move counterclockwise as viewed in FIG. 2 within the viscous fluid that fills the annular space 17. As a result, the viscous fluid in the annular space 17 is caused to flow counterclockwise as viewed in FIG. 2.

Thus, when the pivoting member 11, which supports the pulley 14, is caused to move by the resilient force of the torsion coil spring 15, the direction of the pressure that is applied to the ball 23 is counter to the direction in which the ball 23 is pressed by the compression spring 25, which is incorporated in the check valve 26 that is provided in the intermediate part of the passage 21 in the first partition wall 19. Accordingly, the check valve 26 is opened, as shown in FIG. 4, so that resistance to the movement of the second partition wall 20 within the viscous fluid in the annular space 17 decreases, thus enabling the pivoting member 11 to move rapidly. As a result, the pivoting member 11 is rapidly pivoted by the resilient force of the torsion coil spring 15 to enable the pulley 14 to follow the slack in the belt.

Thus, in the case where the autotensioner of the present invention is used to apply tension to the belt 14, when a part of the belt that is contacted by the pulley 14 becomes tense, that is, when the pivoting member 11 pivots clockwise as viewed in FIG. 2, the pulley 14 slowly and effectively follows the movement of the belt in which the tension is increased, whereas, when the belt becomes slack, that is, when the pivoting member 11 pivots counterclockwise as viewed in FIG. 2, the pulley 14 rapidly follows the belt, thereby preventing occurrence of excessive slack in any part of the belt.

Although in the illustrated embodiment the passage 21 and the check valve 26 are provided in the first partition wall 19, these elements may be provided in the second partition wall 20 and may also be provided in both the first and second partition walls 19 and 20. However, in any case, the check valve 26 must be provided such that it opens the passage 21 only when the pivoting member 11 that supports the pulley 14 is moved by the resilient force of the torsion coil spring 15.

The structure of the check valve 26 is not necessarily limitative to a ball valve such as that illustrated in the figures. It is also possible to adopt other known structures, for example, a reed valve.

A second embodiment of the present invention, which corresponds to the appended Claims 3 and 4, will next be explained.

Figure 6:
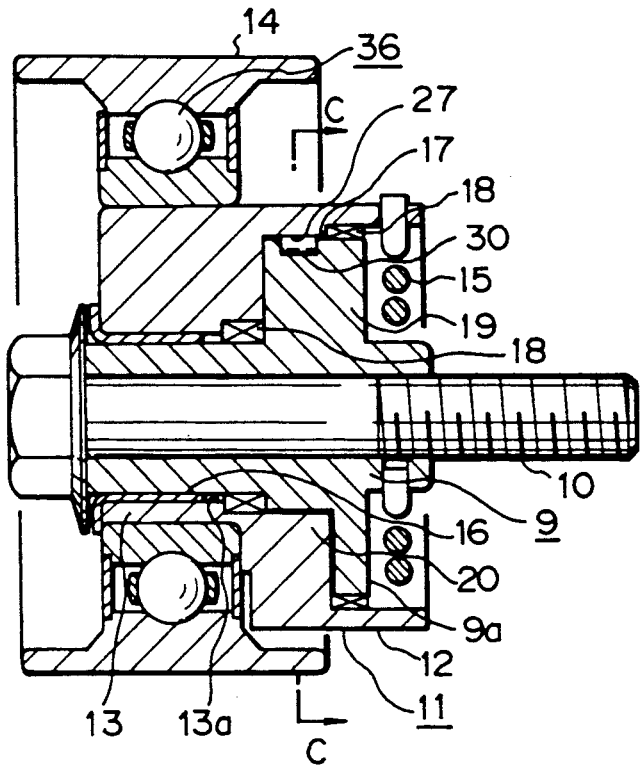
Figure 7:
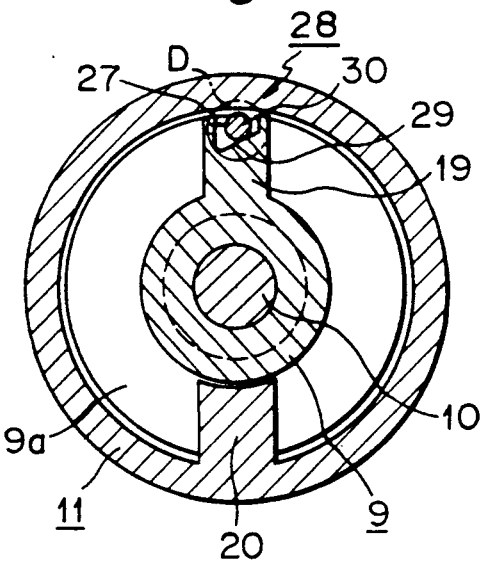
Figure 8:
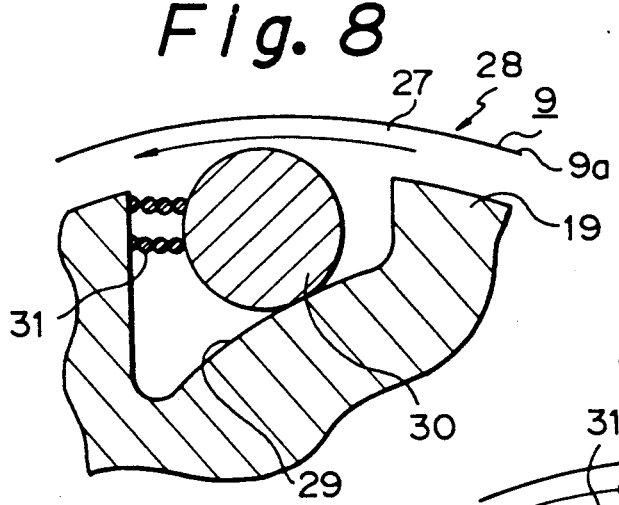
Figure 9:
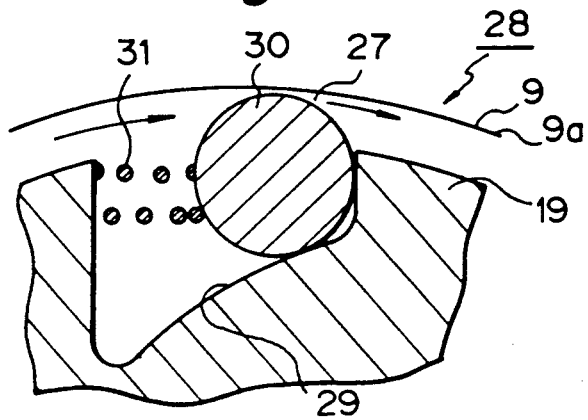

FIGS. 6 to 9 show in combination a second embodiment of the present invention, in which: FIG. 6 is a sectional view showing the whole structure of the embodiment; FIG. 7 is a sectional view taken along the line C—C in FIG. 6; and FIGS. 8 and 9 are enlarged views of the part D of FIG. 7, FIG. 8 showing the behavior of the check valve when the belt becomes slack, and FIG. 9 showing the behavior of the check valve when the belt becomes taut.

In this embodiment, the outer peripheral edge of the first partition wall 19 that is formed on the outer peripheral surface of the fixed shaft 9 is designed to separate from the inner peripheral surface of the pivoting member 11, thereby defining a passage 27 between the outer peripheral edge and the inner peripheral surface, and a check valve 28 is provided in the intermediate part of the passage 27, which is adapted to open the passage 27 only when the pivoting member 11 that supports the pulley 14 is moved by the resilient force of the torsion coil spring 15.

More specifically, the check valve 28 comprises a roller 30 which is loosely fitted in a recess 29 that is formed in the outer peripheral edge of the first partition wall 19, the depth of the recess 29 being continuously varied circumferentially, and a compression spring 31 which is provided between the roller 30 and the inner side surface of the recess 29 to press the roller 30 toward the shallower side of the recess 29.

In this embodiment, when the pivoting member 11, which supports pulley 14, pivots clockwise as viewed in FIG. 7 in response to a sudden increase in the tension in the belt, the check valve 28 closes the passage 27, as shown in FIG. 9, thereby preventing the pivoting member 11 from moving rapidly, and thus enabling the pulley 14 to follow slowly and effectively the movement of the belt in which tension is suddenly increased.

Conversely, when the belt becomes slack, the check valve 28 opens the passage 27, as shown in FIG. 8, so that no great resistance will act on the pivotal movement of the pivoting member 11, thereby enabling the pulley 14 to follow rapidly the movement of the belt.

Since the other arrangements and functions are the same as those in the above-described first embodiment, including the configuration (see FIG. 3) of the second partition wall 20 that is formed on the pivoting member 11, the same elements or portions are denoted by the same reference numerals, and repeated description thereof is omitted.

A third embodiment of the present invention, which corresponds to the appended Claims 3 and 5, will next be explained.

Figure 10:
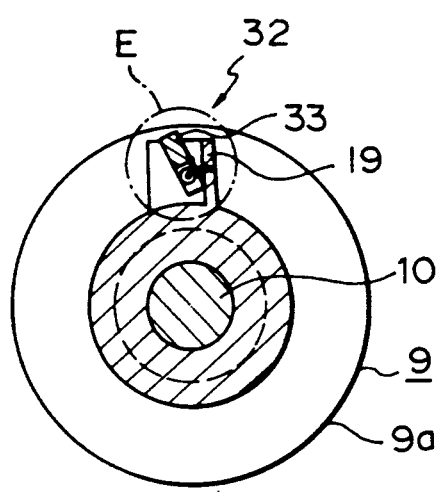
Figure 11:
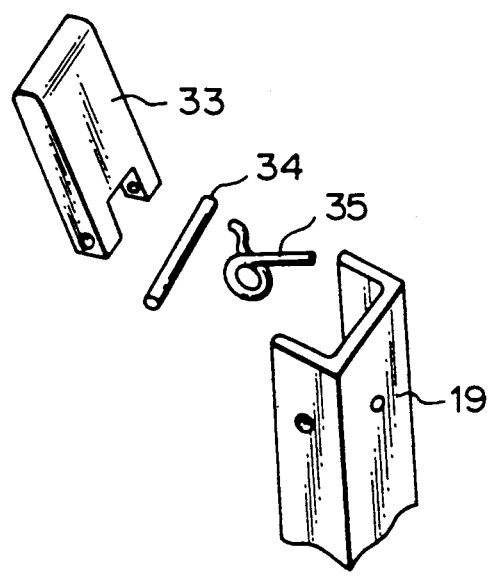
Figure 12:
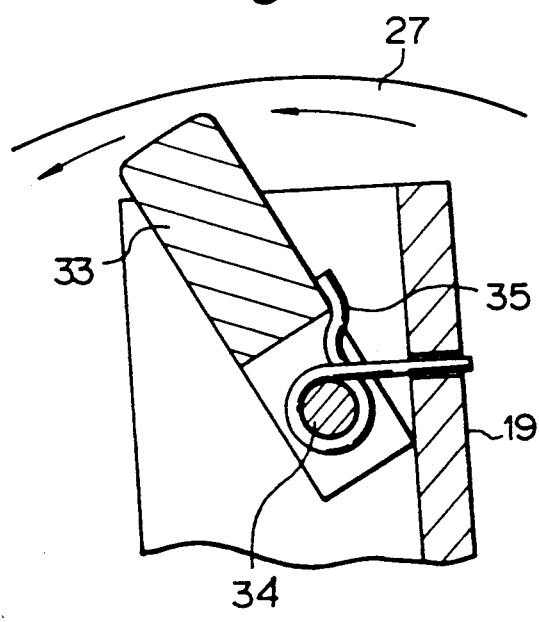
Figure 13:
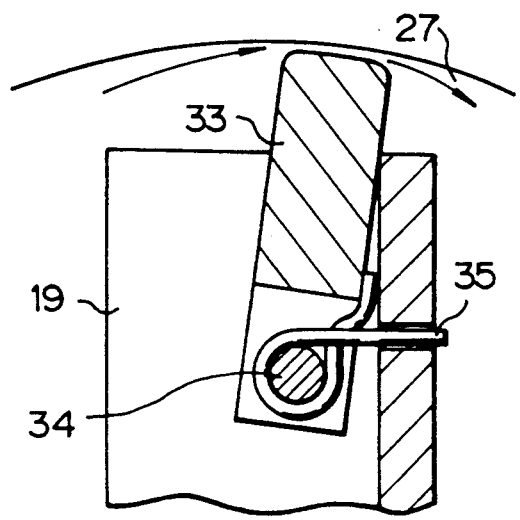
Figure 14:
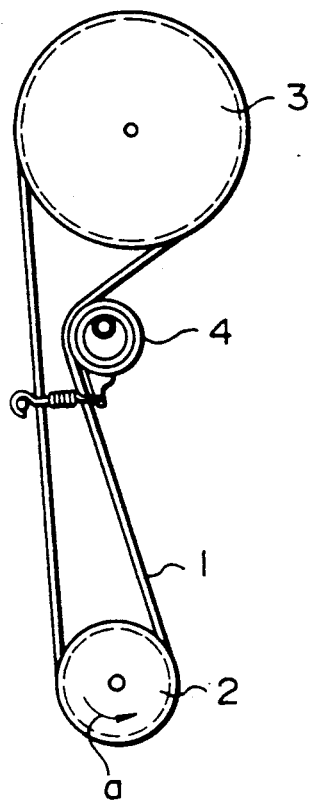
FIG. 14 is a front view of a timing belt driving mechanism of an engine, which is provided with an autotensioner.
Figure 15:
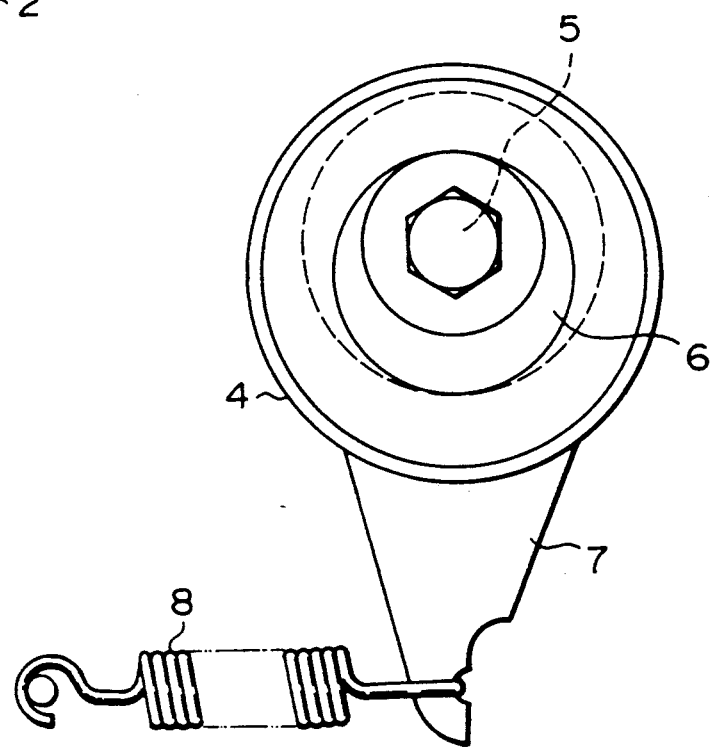
FIG. 15 is a front view showing one example of conventional autotensioners, which is incorporated in the timing belt driving mechanism shown in FIG. 14.

FIGS. 10 to 13 show in combination a third embodiment of the present invention, in which: FIG. 10 is a view corresponding to a sectional view taken along the line C—C in FIG. 6; FIG. 11 is an exploded perspective view of a check valve that is employed in the third embodiment; and FIGS. 12 and 13 are enlarged views of the part E of FIG. 10, FIG. 12 showing the behavior of the check valve when the belt becomes slack, and FIG. 13 showing the behavior of the check valve when the belt becomes taut.

In this embodiment, the outer peripheral edge of the first partition wall 19 that is formed on the outer peripheral surface of the fixed shaft 9 is designed to separate from the inner peripheral surface of the pivoting member 11, thereby defining a passage 27 between the outer peripheral edge and the inner peripheral surface, and a check valve 32 is provided in the intermediate part of the passage 27, which is adapted to open the passage 27 only when the pivoting member 11 that supports the pulley 14 is moved by the resilient force of the torsion coil spring 15, in the same way as in the second embodiment.

The check valve 32 in this embodiment is, however, comprised of a plate-shaped flapper 33 which is pivotally supported at its inner end portion through a pivot shaft 34 that is attached to the outer peripheral edge portion of the first partition wall 19. The outward pivotal movement of the flapper 33 is limited by the abutment between one side of the flapper 33 and the outer peripheral edge of the first partition wall 19. More specifically, this embodiment has a stopper mechanism wherein, when the flapper 33 pivots outwardly about the pivot shaft 34 until the outer peripheral edge of the flapper 33 comes into close proximity to the inner peripheral surface of the pivoting member 11, one side of the flapper 33 abuts against the outer peripheral edge of the first partition wall 19, as described above, thereby preventing the flapper 33 from pivoting any further.

In addition, a torsion spring 35 is provided between the flapper 33 and the first partition wall 19 to cause the flapper 33 to pivot in a direction in which the outer peripheral edge of the flapper 33 comes into close proximity to the inner peripheral surface of the pivoting member 11.

The operation of this embodiment is similar to that of the second embodiment. That is, when the pivoting member 11, which supports pulley 14, pivots clockwise as viewed in FIG. 10 in response to a sudden increase in the level of tension in the belt, the check valve 32 closes the passage 27, as shown in FIG. 13, thereby preventing the pivoting member 11 from moving rapidly, and thus enabling the pulley 14 to follow slowly and effectively the movement of the belt in which the tension is suddenly increased.

Conversely, when the belt becomes slack, the check valve 32 opens the passage 27, as shown in FIG. 12, so that no great resistance will act on the pivotal movement of the pivoting member 11, thereby enabling the pulley 14 to follow rapidly the movement of the belt.

Although in the second and third embodiments the passage 27 and the check valve 28 (32) are provided in between the outer peripheral surface of the first partition wall 19 and the inner peripheral surface of the pivoting member 11, these elements may be provided in between the inner peripheral edge of the second partition wall 20 and the outer peripheral surface of the fixed shaft 9 and may also be provided both in the area between the outer peripheral surface of the first partition wall 19 and the inner peripheral surface of the pivoting member 11 and in the area between the inner peripheral edge of the second partition wall 20 and the outer peripheral surface of the fixed shaft 9. However, in any case, the check valve 28 (32) must be provided such that it opens the passage 27 only when the pivoting member 11 that supports the pulley 14 is moved by the resilient force of the torsion coil spring 15 (i.e., when the pivoting member 11 moves clockwise, as viewed in FIG. 10).

Although in each of the foregoing embodiments the distal end portion of the pivoting member 11 is arranged to be eccentric with respect to the fixed shaft 9 to define the pivot portion 13 and the pulley 14 is supported on the pivot shaft 13, the stroke of the pulley 14 can also be ensured by an arrangement wherein a pivoting arm is provided on the outer peripheral surface of the pivoting member 11 and the pulley 14 is supported through a pivot shaft that is provided at the distal end of this pivoting arm.

The autotensioner of the present invention, arranged as detailed above, has a structure which is easy to lubricate and free from fretting corrosion and which is therefore superior in terms of both durability and reliability, and yet enables the tension in the belt to be constantly maintained at an optimal level and thereby prevents the occurrence of problems such as an undesired shift in the mesh between the belt and the toothed pulleys (driving and driven pulleys).

Although the present invention has been described through specific terms, it should be noted that the described embodiments are not necessarily exclusive and that various changes and modifications may be imparted thereto without departing from the scope of the invention which is limited solely by the appended claims.

What is claimed is:

1. An autotensioner comprising:
   a fixed shaft;
   a pivoting member which is rotatably supported around said fixed shaft, at least the proximal portion of said member having a cylindrical configuration;
   a pulley which is rotatably supported around a pivot shaft that is a part of said pivoting member, said pivot shaft being parallel to said fixed shaft;
   a spring normally rotating said pivoting member in a first rotational direction for pressing said pulley against a member to which tension is to be applied;
   an annular space which is provided between the outer peripheral surface of said fixed shaft and the inner peripheral surface of said pivoting member, said space being filled with a viscous fluid;
   a first partition wall which is formed on a part of the outer peripheral surface of said fixed shaft to partition said annular space circumferentially;
   a second partition wall which is formed on a part of the inner peripheral surface of said pivoting member to partition said annular spaced circumferentially;
   a passage which is defined by a space that is formed by separating at least either one of the outer peripheral edge of said first partition wall and the inner peripheral edge of said second partition wall from a peripheral surface that faces said peripheral edge; and
   a check valve which is provided in the intermediate part of said passage, said check valve being arranged to open said passage only when said pivoting member is moved in a rotational direction opposite said first rotational direction by the member to which tension is applied.

2. An autotensioner according to claim 1, wherein said check valve comprises a recess which is formed in the outer peripheral edge portion of said first partition wall, the depth of said recess being continuously varied circumferentially, a roller which is loosely fitted in said recess, and a spring which presses said roller toward the shallower side of said recess.

3. An autotensioner according to claim 1, wherein said check valve comprises a flapper which is pivotally supported at its inner end portion on the outer peripheral edge portion of said first partition wall, a stopper mechanism which stops the pivotal movement of said flapper when the outer peripheral edge of said flapper comes into close proximity to the inner peripheral surface of said pivoting member, and a spring which causes said flapper to pivot in a direction in which the outer peripheral edge of said flapper comes into close proximity to the inner peripheral surface of said pivoting member.

* * * * *